(12) United States Patent
Damnjanovic et al.

(10) Patent No.: US 7,869,417 B2
(45) Date of Patent: Jan. 11, 2011

(54) MULTIPLEXING AND FEEDBACK SUPPORT FOR WIRELESS COMMUNICATION SYSTEMS

(75) Inventors: Aleksandar Damnjanovic, Del Mar, CA (US); Lorenzo Casaccia, Rome (IT); Niels Peter Skov Andersen, Roskilde (DK)

(73) Assignee: QUALCOMM Incorporated, San Diego, CA (US)

( * ) Notice: Subject to any disclaimer, the term of this patent is extended or adjusted under 35 U.S.C. 154(b) by 1132 days.

(21) Appl. No.: 11/489,918

(22) Filed: Jul. 19, 2006

(65) Prior Publication Data

US 2007/0060167 A1    Mar. 15, 2007

Related U.S. Application Data

(60) Provisional application No. 60/701,967, filed on Jul. 21, 2005, provisional application No. 60/758,075, filed on Jan. 10, 2006.

(51) Int. Cl.
    *H04B 7/212* (2006.01)
(52) U.S. Cl. .................. 370/347; 370/345; 370/337
(58) Field of Classification Search ................ 370/347
    See application file for complete search history.

(56) References Cited

U.S. PATENT DOCUMENTS

| | | | | |
|---|---|---|---|---|
| 6,539,010 | B1 * | 3/2003 | Hagerman et al. | 370/347 |
| 6,567,459 | B1 * | 5/2003 | Hakkinen et al. | 375/132 |
| 7,266,168 | B2 * | 9/2007 | Kwak et al. | 375/347 |
| 2004/0160984 | A1 | 8/2004 | Sidhushayana et al. | |
| 2004/0166869 | A1 | 8/2004 | Laroia et al. | |

OTHER PUBLICATIONS

Ball et al., "Improving GPRS/EDGE end-to-end performance by optimization of the RLC protocol and parameters" Vehicular Technology Conference, 2004. VTC2004-Fall. 2004 IEEE 60th vol. 6, Sep. 26-29, 2004, pp. 4521-4527.
Jenkac et al., "H.264/AVC video transmission over MBMS in GERAN", Multimedia Signal Processing, 2004 IEEE 6th Workshop on Sep. 29-Oct. 1, 2004 pp. 191-194.
Walke B.H. "Mobile Radio Networks: Networking, Protocols and Traffic Performance", 2002, John Wiley & Songs, Chichester, pp. 136-143 and 326-329.
Jenkas, et al.: "Retransmission strategies for MBMS over GERAN," Wireless Communications and Networking Conference, 2005 IEEE Mar. 13-17, 2005, vol. 3, pp. 1773-1779.
3GPP TS 25.211 v6.5.0; "3rd Generation Partnership Project; Technical Specification Group Radio Access Network; Physical channels and mapping of transport channels onto physical channels (FDD)," 3GPP TS 25.211 version 6.5.0, release 6 (Jun. 2005).

(Continued)

*Primary Examiner*—Nick Corsaro
*Assistant Examiner*—Isaak R Jama
(74) *Attorney, Agent, or Firm*—James K. O'Hare

(57) ABSTRACT

A control scheme using packet headers allows GSM EDGE Radio Access Network (GERAN) systems to increase spectral efficiency through multiplexing techniques, such as superposition coding, multi-user packet transmission, joint detection, and/or joint decoding. A fast feedback scheme for GERAN allows Voice over Internet Protocol (VoIP) frames to be transmitted over GERAN air interfaces without excessive feedback latency. As a result, Hybrid Automatic Repeat-reQuest (H-ARQ) acknowledgements may be timely provided for end-to-end VoIP calls that traverse GERAN air interfaces. Additionally, Incremental Redundancy H-ARQ and link quality feedback latencies are decreased.

19 Claims, 5 Drawing Sheets

OTHER PUBLICATIONS

3GPP TS 25.212 v6.5.0; "3rd Generation Partnership Project; Technical Specification Group Radio Access Network; Multiplexing and channel coding (FDD)," 3GPP TS 25.212 version 6.5.0 release 6 (Jun. 2005).

3GPP TS 25.213 v6.2.0; "3rd Generation Partnership Project; Technical Specification Group Radio Access Network; Spreading and Modulation (FDD)," 3GPP TS 25.213 v6.2.0 release 6 (Mar. 2005).

3GPP TS 25.214 v6.5.0; "3rd Generation Partnership Project; Technical Specification Group Radio Access Network; Physical layer procedures (FDD)," 3GPP TS 25.214 v6.5.0 release 6 (Mar. 2005).

3GPP TS 44.060 v7.0.0; "3RD Generation Partnership Project; Technical Specification Group GSM/EDGE Radio Access Network; General Packet Radio Service (GPRS); Mobile Station (MS)—Base Station System (BSS) Interface; Radio Link Control/Medium Access Control (RLC/MAC) protocol," 3GPP TS 44.060 version 7.0.0 release 7 (Jul. 2005).

3GPP2 C.S0002-A; "Physical Layer Standard for cdma2000 Spread Spectrum Systems," 3rd Generation Partnership Project 2 ("3GPP2"), 3GPP2 C.S0002-A, Release A Jun. 9, 2000.

3GPP2 C.S0005-A; "Upper Layer (Layer 3) Signaling Standard for cdma2000 Spread Spectrum Systems," 3rd Generation Partnership Project 2 ("3GPP2"), 3GPP2 C.S0005-A, Release A, Addendum 2, Feb. 2002.

TIA/EIA-98-C; "Recommended Minimum Performance Standards for Dual-Mode Spread Spectrum Cellular Mobile Stations," Telecommunications Industry Association, TIA/EIA-98-C, Nov. 1999.

3GPP2 C:S0024; "cdma2000 High Rate Packet Data Air Interface Specification," 3rd Generation Partnership Project 2 ("3GPP2"), 3GPP2 C.S0024, version 2, TIA/EIA/IS-856, Oct. 27, 2000.

International Search Report—PCT/US2006/028341, International Search Authority—European Patent Office—Mar. 27, 2007.

Written Opinion—PCT/US2006/028341, International Search Authority—European Patent Office—Mar. 27, 2007.

International Preliminary Report on Patentability—PCT/US2006/028341, International Bureau of WIPO—Geneva, Switzerland—Jan. 22, 2008.

TIA/EIA/IS-95; Mobile Station-Base Station Compatibility Standard for Wideband Spread Spectrum Cellular Systems,: ANSI/TIA-95, Jul. 1993.

\* cited by examiner

MULTIPLEXING AND FEEDBACK SUPPORT FOR WIRELESS COMMUNICATION SYSTEMS

CLAIM OF PRIORITY UNDER 35 U.S.C. §119

The present Application for Patent claims priority to (1) Provisional Application Ser. No. 60/701,967, entitled Method and Apparatus for Multiplexing in Wireless Communications, filed on Jul. 21, 2005; and (2) Provisional Application Ser. No. 60/758,075, entitled Some Elements for the Support of VoIP in GERAN, filed on Jan. 10, 2006. These provisional applications are assigned to the assignee of the present Application, and are expressly incorporated by reference as if fully set forth herein, including all figures and tables.

BACKGROUND

1. Field

The present invention relates generally to telecommunications, and, more specifically, to methods, apparatus, and articles of manufacture for multiplexing multiple users and supporting feedback in cellular radio networks.

2. Background

A modern communication system is expected to provide reliable data transmission for a variety of applications, including voice and data applications. Multi-user communications may include a transmitter sending data to multiple receivers, and several transmitters sending data to a receiver. Cellular communication systems employ multi-user communications, for example, between a base transceiver station (BTS) and multiple mobile stations (MSs) within the sector served by the BTS. Known multi-user communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System," (2) the "TIA/EIA-98-C Recommended Minimum Standard for Dual-Mode Wideband Spread Spectrum Cellular Mobile Station," (3) the standard sponsored by a consortium named "3rd Generation Partnership Project" (3GPP) and embodied in a set of documents including documents known as 3G TS 25.211, 3G TS 25.212, 3G TS 25.213, and 3G TS 25.214 (the "W-CDMA standard"), (4) the standard sponsored by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," (5) the 1xEV-DO standard "TIA/EIA/IS-856 cdma2000 High Rate Packet Data Air Interface Specification," as well as other standards.

A TDMA system may implement the standards known as Global System for Mobile Communications (GSM). GSM-based networks are widely deployed throughout the world. General Packet Radio Service (GPRS) and its enhanced version known as Enhanced Data rates for GSM Evolution (EDGE) are data services available at some GSM-compatible mobile stations (e.g., cellular telephones). GSM, GPRS, and EDGE may also be collectively referred to as GSM EDGE Radio Access Network or GERAN.

GERAN air interfaces may use frequency hopping. Frequency hopping is a technique that provides frequency diversity over time. A frequency hopping system transmits on a different carrier frequency during every transmission time unit or slot, which typically has a duration of twenty milliseconds. Consecutive hops from one carrier frequency to another are generally made between non-contiguous carrier frequencies to reduce frequency-selective fading of consecutive frames, i.e., to reduce the probability that blocks in consecutive frames will not be correctly decoded at a receiver.

The demand for wireless services continues to increase, while the radio spectrum is either fixed for given wireless applications or available at high cost. Therefore, increased ability to provide services within a fixed spectral allocation is a desirable attribute of wireless systems, including GSM-based cellular systems.

Internet protocol (IP) is used to transport data packets (datagrams) across many networks, most notably the Internet. Voice may be encapsulated in IP packets and transported as data over such networks. In fact, voice over IP (VoIP), also known as Internet telephony or IP telephony, is a fast-growing application of IP-based networks. A call connecting a mobile station to another telephone terminal may be routed using VoIP along at least some portion of the route between the mobile station and the other terminal. Such a call may be converted between VoIP and another protocol at the air interface of the cellular network serving the mobile station. It may be preferable, however, to have end-to-end IP-based connectivity, assuming this is feasible under existing system constraints.

One problem with transmitting IP datagrams over a GERAN air interface is the latency of feedback information inherent in the GSM standards. Typically, a GERAN system will transmit twelve blocks of twenty millisecond duration each, and then send a polling request to the receiver (e.g., to a mobile station or a BTS), asking the receiver to inform the transmitter about the status of the sent blocks. Thus, an acknowledgement of the first block in a twelve-block series of blocks will be received about 240 milliseconds later, or with even greater latency. End-to-end acknowledgements of a VoIP call might take sill longer because of additional en route delays. This is typically too much latency for live telephone conversations. Furthermore, link quality in a mobile environment may deteriorate rapidly, and a delay of 240 milliseconds may be too long for providing timely link quality indications. Still further, additional aspects of cellular system operation may benefit from decreased latency of feedback mechanisms.

There is therefore a need in the art for methods and apparatus that increase spectral efficiency of wireless systems. There is also a need in the art for shortening feedback latency in GERAN-based and similar wireless systems. Moreover, extensive modifications of deployed equipment may be expensive, and compatibility with existing customer equipment may be desirable from a marketing perspective. Therefore, there is a need in the art to address the above-mentioned deficiencies while preserving compatibility with currently-existing GERAN mobile stations and avoiding extensive changes to cellular network hardware serving such stations.

SUMMARY

Embodiments disclosed herein address the above stated needs by multiplexing multiple downlink packets/blocks intended for multiple mobile stations into the same time slot and the same carrier frequency, and by providing a fast feedback mechanism for GERAN air interfaces.

In an embodiment, a method is provided for transmitting information over a time division multiple access air interface of a cellular communication system. The method includes grouping a plurality of mobile stations in a sector served by a base transceiver station of the cellular communication system. The plurality of mobile stations includes a first mobile station and a second mobile station. The method further includes transmitting from the base transceiver station on a first carrier frequency during a first time slot a first downlink data block to the first mobile station using a first transmitted power. The method further includes transmitting from the base transceiver station on the first carrier frequency during the first time slot a second downlink data block to the second mobile station using a second transmitted power. The first transmitted power and the second transmitted power are such that the first mobile station can receive and decode the first data block, and the second mobile station can receive and decode the second data block.

In an embodiment, a base transceiver station of a time division multiple access cellular communication system includes a receiver, a transmitter, a memory storing program code, and a processor coupled to the receiver, transmitter, and the memory. The processor, under control of the program code, is configured to cause the base transceiver station to perform the following steps:

(1) Grouping a plurality of mobile stations in a sector served by the base transceiver station, the plurality of mobile stations including a first mobile station and a second mobile station.

(2) Transmitting from the base transceiver station on a first carrier frequency during a first time slot a first downlink data block to the first mobile station using a first transmitted power.

(3) Transmitting from the base transceiver station on the first carrier frequency during the first time slot a second downlink data block to the second mobile station using a second transmitted power;

The first transmitted power and the second transmitted power are such that the first mobile station can receive and decode the first data block, and the second mobile station can receive and decode the second data block.

In an embodiment, a machine-readable medium stores instructions. When the instructions are executed by at least one processor of a base transceiver station of a time division multiple access cellular communication system, the instructions cause the at least one processor to configure the base transceiver station to perform the following operations:

(1) Grouping a plurality of mobile stations in a sector served by the base transceiver station, the plurality of mobile stations including a first mobile station and a second mobile station.

(2) Transmitting from the base transceiver station on a first carrier frequency during a first time slot a first downlink data block to the first mobile station using a first transmitted power.

(3) Transmitting from the base transceiver station on the first carrier frequency during the first time slot a second downlink data block to the second mobile station using a second transmitted power.

The first transmitted power and the second transmitted power are such that the first mobile station can receive and decode the first data block, and the second mobile station can receive and decode the second data block.

In an embodiment, a method is provided for transmitting information over a time division multiple access air interface of a cellular communication system. The method includes grouping a plurality of mobile stations in a sector served by a base transceiver station of the cellular communication system, the plurality of mobile stations including a first mobile station and a second mobile station. The method further includes transmitting from the base transceiver station on a first carrier frequency during a first time slot a downlink multi-user data packet to the first and second mobile stations. The multi-user downlink data packet comprises first payload data intended for the first mobile station, second payload data intended for the second mobile station, and a header. The header indicates to the first and second mobile stations the first payload data and the second payload data so that the first mobile station can identify and use the first payload data and ignore the second payload data, and the second mobile station can identify and use the second payload data and ignore the first payload data In an embodiment, a base transceiver station of a time division multiple access cellular communication system is provided. The base transceiver station includes a receiver, a transmitter, a memory storing program code, and a processor coupled to the receiver, transmitter, and the memory. The processor under control of the program code is configured to cause the base transceiver station to perform the following steps:

(1) Grouping a plurality of mobile stations in a sector served by the base transceiver station, the plurality of mobile stations including a first mobile station and a second mobile station.

(2) Transmitting from the base transceiver station on a first carrier frequency during a first time slot a multi-user data packet to the first and second mobile stations.

The multi-user data packet includes first payload data intended for the first mobile station, second payload data intended for the second mobile station, and a header. The header indicates to the first and second mobile stations the first payload data and the second payload data so that the first mobile station can identify and use the first payload data and ignore the second payload data, and the second mobile station can identify and use the second payload data and ignore the first payload data.

In an embodiment, a machine-readable medium stores instructions. When the instructions are executed by at least one processor of a base transceiver station of a time division multiple access cellular communication system, the instructions cause the at least one processor to configure the base transceiver station to perform the following operations:

(1) Grouping a plurality of mobile stations in a sector served by the base transceiver station, the plurality of mobile stations including a first mobile station and a second mobile station.

(2) Transmitting from the base transceiver station on a first carrier frequency during a first time slot a multi-user data packet to the first and second mobile stations.

The multi-user data packet includes first payload data intended for the first mobile station, second payload data intended for the second mobile station, and a header. The header indicates to the first and second mobile stations the first payload data and the second payload data so that the first mobile station can identify and use the first payload data and ignore the second payload data, and the second mobile station can identify and use the second payload data and ignore the first payload data.

In an embodiment, a method is provided for receiving information over a time division multiple access air interface of a cellular communication system. The method includes these steps, which may be performed at a first mobile station of the cellular communication system:

(1) Receiving from a base transceiver station of the cellular communication system on a first carrier frequency during a first time slot a transmission comprising a first data block intended for the first mobile station and a second data block comprising control information and payload data intended for a second mobile station of the cellular communication system. The first data block was transmitted by the base transceiver station with a first transmitted power, and the second data block was transmitted by the base transceiver station with a second transmitted power. The second transmitted power is greater than the first transmitted power. Note that the first and second data blocks are superposed (superposition coded) on each other.

(2) Processing the received transmission to decode the second data block.

(3) Cancelling from the received transmission the second data block to obtain a successive interference cancelled (SIC) received transmission.

(4) Processing the SIC received transmission to decode the first data block.

In an embodiment, a mobile station of a time division multiple access cellular communication system is provided. The mobile station includes a receiver, a transmitter, a memory storing program code, and a processor coupled to the receiver, transmitter, and the memory. The processor under control of the program code is configured to cause the mobile station to perform the following steps:

(1) Receiving a transmission from a base transceiver station of the cellular communication system on a first carrier frequency during a first time slot. The received transmission includes a first data block intended for the mobile station and a second data block. The second data block includes control information and payload data intended for another mobile station of the cellular communication system. The first data block was transmitted with a first transmitted power, and the second data block was transmitted with a second transmitted power which is greater than the first transmitted power. In this way, the first and second data blocks are superposed on each other.

(2) Processing the received transmission to decode the second data block.

(3) Cancelling from the received transmission the second data block to obtain a successive interference cancelled (SIC) received transmission.

(4) Processing the SIC received transmission to decode the first data block.

In an embodiment, a machine-readable medium stores instructions. When the instructions are executed by at least one processor of a mobile station of a time division multiple access cellular communication system, the at least one processor configures the mobile station to perform the following operations:

(1) Receiving from a base transceiver station of the cellular communication system on a first carrier frequency during a first time slot a transmission that includes a first data block intended for the mobile station, and a second data block. The second data block includes control information and payload data intended for another mobile station of the cellular communication system. The first data block was transmitted with a first transmitted power and the second data block was transmitted with a second transmitted power that is greater than the first transmitted power. In this way the first and second data blocks are superposed on each other.

(2) Processing the received transmission to decode the second data block.

(3) Cancelling from the received transmission the second data block to obtain a successive interference cancelled (SIC) received transmission.

(4) Processing the SIC received transmission to decode the first data block.

In an embodiment, a mobile station of a time division multiple access cellular communication system includes means for receiving a transmission from a base transceiver station of the cellular communication system on a first carrier frequency during a first time slot. The transmission includes a first data block intended for the mobile station, and a second data block. The second data block includes control information and payload data intended for another mobile station of the cellular communication system. The first data block was transmitted with a first transmitted power and the second data block was transmitted with a second transmitted power, the second transmitted power being greater than the first transmitted power. In this way, the first and second data blocks are superposed on each other. The mobile station also includes means for processing the received transmission to decode the second data block. The mobile station further includes means for cancelling from the received transmission the second data block to obtain a successive interference cancelled (SIC) received transmission. The mobile station additionally includes means for processing the SIC received transmission to decode the first data block.

In an embodiment, a method is provided for receiving information over a time division multiple access air interface of a cellular communication system. The method includes, at a first mobile station of the cellular communication system, receiving from a base transceiver station of the cellular communication system a multi-user packet. The multi-user packet includes first payload data intended for the first mobile station, second payload data intended for a second mobile station of the cellular communication system, and control information. The control information indicates (delimits or otherwise indicates boundaries of) the first payload data and the second payload data within the multi-user packet. The method further includes decoding the multi-user packet at the first mobile station to obtain a decoded multi-user packet. The method further includes using the control information to obtain the first payload data from the decoded multi-user packet.

In an embodiment, a mobile station of a time division multiple access cellular communication system is provided. The mobile station includes a receiver, a transmitter, a memory storing program code, and a processor coupled to the receiver, transmitter, and the memory. The processor, under control of the program code, is configured to cause the mobile station to perform the following steps:

(1) Receiving from a base transceiver station of the cellular communication system a multi-user packet that includes first payload data intended for the mobile station, second payload data intended for another mobile station of the cellular communication system, and control information. The control information indicates the first payload data and the second payload data within the multi-user packet.

(2) Decoding the multi-user packet to obtain a decoded multi-user packet.

(3) Using the control information to obtain the first payload data from the decoded multi-user packet.

In an embodiment, a machine-readable medium stores instructions. When the instructions are executed by at least one processor of a mobile station of a time division multiple access cellular communication system, the at least one processor configures the mobile station to perform the following operations:

(1) Receiving from a base transceiver station of the cellular communication system a multi-user packet that includes first payload data intended for the mobile station, second payload data intended for another mobile station of the cellular communication system, and control information. The control information indicates the first payload data and the second payload data within the multi-user packet.

(2) Decoding the multi-user packet to obtain a decoded multi-user packet.

(3) Using the control information to obtain the first payload data from the decoded multi-user packet.

In an embodiment, a mobile station of a time division multiple access cellular communication system includes means for receiving from a base transceiver station of the cellular communication system a multi-user packet. The multi-user packet includes first payload data intended for the mobile station, second payload data intended for another mobile station of the cellular communication system, and control information that indicates (e.g., delimits) the first payload data and the second payload data within the multi-user packet. The mobile station further includes means for decoding the multi-user packet to obtain a decoded multi-user packet. The mobile station also includes means for using the control information to obtain the first payload data from the decoded multi-user packet.

In an embodiment, a method of providing acknowledgement for a Radio Link Control/Medium Access Control (RLC/MAC) block sent by a sender to a receiver over a GERAN air interface includes (1) receiving by the receiver through the air interface a first RLC/MAC block sent by the sender, and (2) in response to receipt of the first RLC/MAC block by the receiver, automatically transmitting from the receiver to the sender through the air interface a first acknowledgement of the first RLC/MAC block. The first acknowledgement is a positive acknowledgement (ACK) if the first block was successfully decoded by the receiver, or a negative acknowledgement if the first block was not successfully decoded by the receiver. The receiver may be a mobile station, and the sender may be a base transceiver station. Alternatively, the sender may be a mobile station, and the receiver may be a base transceiver station.

In an embodiment, a mobile station of a GERAN cellular communication system includes a receiver, a transmitter, a memory storing program code, and a processor coupled to the receiver, transmitter, and the memory. The processor, under control of the program code, is configured to cause the mobile station to perform the following steps:

(1) Receiving through the air interface of the cellular communication system a first RLC/MAC block sent by a base transceiver station of the cellular communication system.

(2) In response to receipt of the first RLC/MAC block by the mobile station, automatically transmitting from the mobile station to the base transceiver station through the air interface a first acknowledgement of the first RLC/MAC block. The first acknowledgement is (1) a positive acknowledgement (ACK) if the first block was successfully decoded by the mobile station, or (2) a negative acknowledgement if the first block was not successfully decoded by the mobile station.

In an embodiment, a machine-readable medium stores instructions. When the instructions are executed by at least one processor of a mobile station of a GERAN cellular communication system, the instructions cause the at least one processor to configure the mobile station (1) to receive through the air interface of the cellular communication system a first RLC/MAC block sent by a base transceiver station of the cellular communication system, and (2) in response to receipt of the first RLC/MAC block by the mobile station, automatically transmit from the mobile station to the base transceiver station through the air interface a first acknowledgement of the first RLC/MAC block. The first acknowledgement is (1) a positive acknowledgement (ACK) if the first block was successfully decoded by the mobile station, or (2) a negative acknowledgement if the first block was not successfully decoded by the mobile station.

In an embodiment, a mobile station of a cellular communication system compliant with Global System for Mobile Communications (GSM) Enhanced Data rates for GSM Evolution (EDGE) Radio Access Network (GERAN) standard, is provided. The mobile station includes means for receiving via a GERAN air interface of the cellular communication system an RLC/MAC block sent by a base transceiver station of the cellular communication system. The mobile station further includes means for automatically transmitting in response to receipt of the RLC/MAC block by the mobile station, from the mobile station to the base transceiver station through the GERAN air interface an acknowledgement of the RLC/MAC block. If the block was successfully decoded by the mobile station, the acknowledgement is a positive acknowledgement (ACK). If the block was not successfully decoded by the mobile station, the acknowledgement is a negative acknowledgement.

In an embodiment, a base transceiver station of a GERAN cellular communication system includes a receiver, a transmitter, a memory storing program code, and a processor. The processor is coupled to the receiver, the transmitter, and the memory. The processor under control of the program code is configured to cause the base transceiver station to (1) receive through the air interface of the cellular communication system a first RLC/MAC block sent by a mobile station of the cellular communication system, and (2) in response to receipt of the first RLC/MAC block by the base transceiver station, automatically transmit from the base transceiver station to the mobile station through the air interface a first acknowledgement of the first RLC/MAC block. The first acknowledgement is (1) a positive acknowledgement (ACK) if the first block was successfully decoded by the base transceiver station, or (2) a negative acknowledgement if the first block was not successfully decoded by the base transceiver station.

In an embodiment, a machine-readable medium stores instructions. When the instructions are executed by at least one processor of a base transceiver station of a GERAN cellular communication system, the instructions cause the at least one processor to configure the base transceiver station to (1) receive through the air interface of the cellular communication system a first RLC/MAC block sent by a mobile station of the cellular communication system, and (2) in response to receipt of the first RLC/MAC block by the base transceiver station, automatically transmit from the base transceiver station to the mobile station through the air interface a first acknowledgement of the first RLC/MAC block. The first acknowledgement is (1) a positive acknowledgement (ACK) if the first block was successfully decoded by the base transceiver station, or (2) a negative acknowledgement if the first block was not successfully decoded by the base transceiver station.

These and other embodiments and aspects of the present invention will be better understood with reference to the following description, drawings, and appended claims.

DETAILED DESCRIPTION

Figure 1:
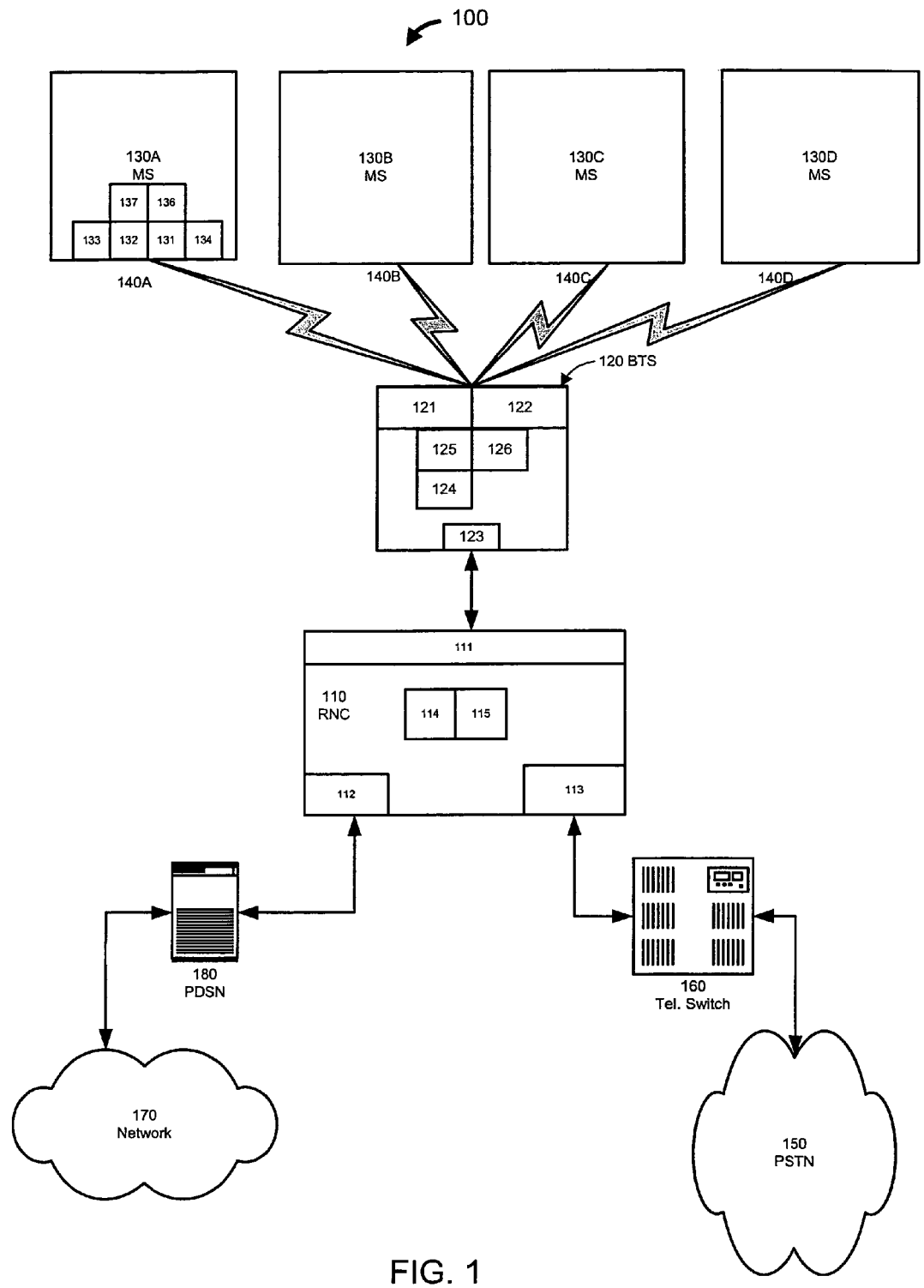
FIG. 1 is a high-level block diagram showing selected components of a cellular radio network configured in accordance with aspects of the present invention.

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment," "alternative variant," and similar phrases are used to indicate one of a number of different possible embodiments or variants. The number of possible embodiments or variants is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

Base transceiver stations (BTSs) and base station controllers (BSCs) are parts of a network called "radio network," "RN," "access network," or "AN." A base station controller may also be referred to as a radio network controller or "RNC." A radio network may be a GERAN-based network. The radio network may transport data packets between multiple mobile stations (MSs), also known as user equipment devices. The radio network may be further connected to additional networks outside the radio network, such as a corporate intranet, the Internet, another radio network, or a conventional public switched telephone network (PSTN), and may transport data and voice between each mobile station and such outside networks.

Embodiments in accordance with aspects of the invention may use superposition coding, multi-user packet transmission, and joint detection and decoding communication techniques. The following paragraphs explain these techniques.

Superposition coding refers to the use of the same transmission resource to communicate with multiple receivers. In this context, the use of the same transmission resource refers to simultaneous transmission of data from a transmitter to the multiple receivers using the same frequency and time slot. By way of illustration, consider a radio transmitter Tx communicating (1) with a first receiver $R_{x1}$ over a first physical communication link $L_1$, and (2) with a receiver $R_{x2}$ over a second communication link $L_2$. Assume that the radio conditions are weak for the first receiver/link and strong for the second receiver/link. (This situation may be temporary, as radio conditions change constantly, especially for mobile stations.) In other words, for a fixed transmitted radio power the signal to interference and noise ratio (SINR) and a carrier-to-interference (C/I) ratio for the first receiver are lower (or much lower) than the corresponding SINR and C/I ratio for the second transmitter. The transmitter Tx with knowledge of the relative radio conditions for the two receivers can apportion its power budget for a particular slot and a particular carrier frequency between the two receivers so that a first block of data intended for the first receiver $R_{x1}$ (the one in the weaker radio conditions) is transmitted with higher power than a second block of data intended for the second receiver $R_{x2}$ (the one in the stronger radio conditions). For example, the transmitter Tx may dedicate sufficient power to the block intended for the first receiver $R_{x1}$ to allow the first receiver $R_{x1}$ to decode this block given the current radio conditions and the additional interference due to transmission of the second block to the second receiver $R_{x2}$. The transmitter Tx may then dedicate less power to the block intended for the second receiver $R_{x2}$, but still sufficient for the second receiver $R_{x2}$ to decode the second block using, for example, interference cancellation to eliminate or reduce the interference caused by the transmission of the first block.

The transmitter then transmits the two blocks on the same carrier frequency and at the same time. Thus, it can be said that the two blocks "collide."

Because the first block of data is transmitted with higher power allocation than the second block, the second block simply appears to the first receiver $R_{x1}$ as an increase in noise or interference. If the power offset between the transmissions of the two blocks is high enough, the degradation of the SINR at the first receiver $R_{x1}$ may be small and even inconsequential. (This need not always be the case.) Thus, the first receiver $R_{x1}$ should be able to decode the first block if it is transmitted with sufficient power relative to the transmission rate of the first block, the current radio conditions, and the additional interference caused by the transmission of the second block.

The second receiver $R_{x2}$ should also be able to decode the first block, because it receives it with a better SINR than the first receiver $R_{x1}$ due to the stronger radio conditions of the second receiver $R_{x2}$. Once the second receiver $R_{x2}$ decodes the first block, it can treat is as interference and cancel it from the total signal received during the period of time when the two blocks were received, using known interference cancellation techniques. The remaining signal represents the second block in combination with noise and interference originating from other sources. The second receiver $R_{x2}$ should be able to decode the second block if the second block is transmitted with sufficient power relative to the transmission rate of the second block and the radio conditions of the second receiver $R_{x2}$, albeit with lower power than the first block.

Note that this method may be extended to three or more receivers. For example, most power could be allocated for transmissions to the receiver in the weakest radio conditions, least power could be allocated to transmissions to the receiver in the strongest radio conditions, and intermediate power could be allocated to the receiver in intermediate radio conditions. The receiver in the strongest radio conditions could then decode the block intended for the receiver in the weakest radio conditions, cancel the decoded block from the received signal, decode the block intended for the receiver in intermediate radio conditions, cancel the second decoded block, and finally decode the block intended for itself. (Such decoding/cancellation process may be referred to as successive interference cancellation.) The receiver in intermediate radio conditions could also decode the block intended for the receiver in the weakest radio conditions, cancel it from the received signal, and then decode the block intended for itself. The receiver in the weakest radio conditions may be able to directly decode the block intended for it, because that block is transmitted at the highest power level. After perusal of this document, a person skilled in the art should be able to extend successive interference cancellation techniques to four or more receivers without excessive experimentation or further invention.

Analogous processes may be performed at a single receiver when multiple transmitters simultaneously transmit to the single receiver on the same frequency. In other words, multi-user joint detection using techniques such as successive interference cancellation may be employed to decode multiple packets originating from multiple transmitters and that collide (i.e., are received simultaneously) at the receiver. The receiver may be a base transceiver station, and the multiple transmitters may be mobile stations.

Note that techniques other than interference cancellation may be used in implementing superposition coding.

Multi-user packet transmission may also be used to multiplex two or more users into a single slot (i.e., into the same frequency-time allocation). For example, a transmitter may form a packet with different payload data intended for two or more different receivers. Each of the two or more receivers may decode the entire packet, and determine which part of the packet is intended for it from the packet's header or from another form of signaling. Multi-user packet communications enhance spectrum utilization through statistical multiplexing, particularly for live voice communications that typically include considerable percentage of silence periods. For example, if two users (e.g., mobile stations) share a slot and voice activity is 50 percent of the time for each of the two users, only a single user actually occupies the slot half of the time, 25 percent of the time neither user occupies the slot, and both users need to occupy the slot during the remaining 25 percent of the time. During the remaining 25 percent of the time, base station may utilize multi-user packet transmission or superposition coding techniques. Hard capacity of GERAN may thus be doubled for groups of two mobile stations sharing a slot. If three mobile stations share a slot, hard limit on capacity may be tripled.

The gains realizable from statistical multiplexing typically exceed any losses from the additional overhead that may be required to send the same packet to multiple receivers.

FIG. 1 illustrates selected components of a GERAN-based (e.g., GSM-compliant) communication network 100, which includes a radio network controller 110 coupled to a wireless base transceiver station 120. The base transceiver station 120 communicates with mobile stations 130A, 130B, 130C, and 130D through corresponding wireless communication links 140A through 140D, as shown. The radio network controller 110 is coupled to a public switched telephone network 150 through a telephone switch 160, and to a packet switched network 170 through a packet data server node (PDSN) 180. Data interchange between various network elements, such as the radio network controller 110 and the packet data server node 180, can be implemented using any number of protocols, for example, the Internet Protocol, an asynchronous transfer mode (ATM) protocol, T1, E1, frame relay, and other protocols.

In the illustrated embodiment, the communication network 100 provides to the mobile stations 130 data communication services, cellular telephone services, and telephone services through VoIP. In alternative embodiments, the communication network 100 may provide to the mobile stations 130 only data services (such as VoIP) or only cellular telephone services.

The mobile stations 130 may include wireless telephones, wireless modems, personal digital assistants, wireless local loop apparatus, PC cards, external or internal modems, and other communication devices. A typical mobile station, for example, the user equipment device 130A, may include receiver circuitry 131, transmitter circuitry 132, an encoder 133, a decoder 134, a processor 136, and a memory device 137. The receiver circuitry 131, transmitter circuitry 132, encoder 133, and decoder 134 are configured by the processor 136 executing code stored in the memory device 137. Each mobile station 130 is configured to communicate data and voice with the BTS 120 using a GERAN (GSM) protocol. Each communication channel 140 may include both a forward link and a reverse link between the BTS 120 and a corresponding user equipment device 130.

The base transceiver station 120 includes one or more wireless receivers (e.g., a receiver 121), one or more wireless transmitters (e.g., a transmitter 122), one or more radio network controller interfaces (e.g., an interface 123), one or more memory devices (e.g., a memory device 124), one or more processors (e.g., a processor 125), and encoder/decoder circuitry (e.g., encoder/decoder circuitry 126). The receiver 121 and transmitter 122 of the base transceiver station 120 are configured by the processor 125 operating under control of the program code stored in the memory device 124 to establish forward and reverse links with the user equipment devices 130 in order to send data and voice packets to and receive data and voice packets from the user equipment devices 130. In the case of data services (including VoIP), for example, the base transceiver station 120 may receive forward link data packets from the packet switched network 170 through the packet data server node 180 and through the radio network controller 110, and transmit these packets to the user equipment devices 130. The base transceiver station 120 may receive reverse link data packets that originate at the user equipment devices 130, and forward these packets to the packet switched network 170 through the radio network controller 110 and the packet data server node 180. In the case of telephone services, the base transceiver station 120 may receive forward link data packets from the telephone network 150 through the telephone switch 160 and through the radio network controller 110, and transmit these packets to the user equipment devices 130. Voice carrying packets originating at the user equipment devices 130 may be received at the base transceiver station 120 and forwarded to the telephone network 150 via the radio network controller 110 and the telephone switch 160.

In variants of the embodiment shown in FIG. 1, the mobile stations 130 and the BTS 120 are configured to communicate with each other using superposition coding, multi-user packets, joint decoding, and/or joint detection. In one variant, for example, the mobile stations 130A and 130B are configured to communicate with the BTS 120 selectively using superposition coding, multi-user packets, and joint decoding and detection; the mobile stations 130C and 130D, on the other hand, are legacy devices that communicate with the BTS 120 using conventional GSM protocols.

In one variant, the BTS 120, under control of its processor 125 executing the program code stored in the memory device 124, configures itself and the mobile stations 130A and 130B for downlink communications using the same transmission resource and superposition coding. (Downlink communications are communications from the radio network to the mobile stations.) In other words, the BTS 120 sends data packets to the mobile stations 130A and 130B on the same carrier frequency and during the same time period (slot) at least some of the time.

In another variant, the BTS 120, under control of its processor 125 executing the program code stored in the memory device 124, configures itself and the mobile stations 130A and 130B for downlink communications using multi-user packets and statistical multiplexing. In other words, the BTS 120 sends the same packet to the mobile stations 130A and 130B, with different portions of the packet containing payload data intended for the different mobile stations. Each of the mobile stations 130A or 130B decodes the entire packet, but uses only the payload data intended for it, ignoring the payload data intended for the other mobile station 130.

In yet another variant, the BTS 120, under control of its processor 125 executing the program code stored in the memory device 124, selectively configures itself and the mobile stations 130A and 130B for downlink communications using multi-user packets or superposition coding. The BTS 120 may configure itself and the mobile stations 130A/B for downlink communications using superposition coding when the two mobile stations have sufficiently disparate radio conditions. Spectral efficiency gains are best realized through superposition coding when the radio conditions are disparate at the multiple receivers. Thus, the BTS may configure itself and the mobile stations 130A/B for superposition coding on the downlink when the C/I ratios for the two (or more) mobile stations differ by at least a predetermined extent. For example, the BTS 130 may match (i.e., group) two or more mobile stations when their respective C/I ratios differ by at least 10 dB, by at least 6 dB, or by at least 3 dB. Otherwise, i.e., if the C/I ratios for the two or more grouped mobile stations differ by less than a predetermined extent such as 10 dB, 6 dB, or 3 dB, the BTS 120 may configure itself and the mobile stations for downlink communications with multi-user packets, realizing statistical multiplexing gains. As another example, the BTS 120 may employ multi-user packet downlink communications when there is no payload data for at least one of the mobile stations multiplexed in a given slot, and employ superposition coding when payload data need be simultaneously transmitted to all the mobile stations multiplexed in the given slot.

The radio network (e.g., the BTS 120) may terminate a transmission early for all mobile stations grouped together if acknowledgements from all these mobile stations are received for a given packet before the maximum number of repetitions of the packet have been transmitted. Termination of transmission upon receipt of acknowledgement from fewer than all mobile stations addressed in the same slot may therefore be prevented.

Note that the BTS 120 may configure one or more MS pairs (or higher-order sets) for downlink communications using superposition coding, one or more MS pairs (or higher-order sets) for downlink communications using multi-user packets, and/or one or more MSs for downlink communications using conventional GSM-based (non-multiplexed) methods. Note also that a mobile station that is capable of downlink communications using superposition coding and/or multi-user packets need not use these techniques at all times. For example, such a mobile station may be configured for downlink communications using conventional GSM-based methods when it cannot be matched with another such mobile station, or when there is no need for the additional gains that can flow from multiplexing a plurality of mobile stations into a single slot.

Turning now to uplink communications (from the mobile stations to the radio network), the BTS 120 may simultaneously receive colliding data packets on the uplink from the mobile stations 130A and 130B on the same carrier frequency. (The uplink carrier frequency for the mobile stations 130A and 130B may be the same, but differ from the downlink carrier frequency for these mobile stations.) Thus, the same two or more mobile stations that are paired for downlink communications using superposition coding and/or multi-user packets may also share the same uplink slot. Concurrently, the BTS 120 may conduct uplink communications with legacy mobile stations (e.g., the mobile stations 130C and 130D) using conventional non-multiplexed GSM-based methods.

Thus, the spectral efficiency of the system 100 is increased by means of multiplexing the mobile stations 130A and 130B into a single slot, and the interference between these two units sharing the same slot is addressed through advanced encoding and decoding techniques, such as superposition coding, multi-user packets, and joint detection and decoding, as described above. In some variants, robustness and link efficiency are improved through use of hybrid Automatic Repeat-reQuest (H-ARQ) techniques, for example, type II H-ARQ. In some variants, only two transmission time interval (TTI) transmissions are used (single retransmission); in other variants, three TTI transmissions are used (two retransmissions). The use of H-ARQ techniques may thus increase delays, for example, the maximum effective TTI may be increased from 20 milliseconds to 40 or 60 milliseconds.

In addition to increased capacity, the system 100 reduces the changes to the physical layer structure of GSM-based communications. Certain changes are implemented in order to accommodate control channels that facilitate H-ARQ type II operation, multi-user packets, superposition coding, and joint detection and decoding, but the system 100 is deployed in backward compatible manner. In this way, the BTS 120 supports legacy mobile stations 130C and 130D using the same carrier frequency sets as the mobile stations 130A and 130B, which are capable of multiplexed operation described above.

Figure 2:
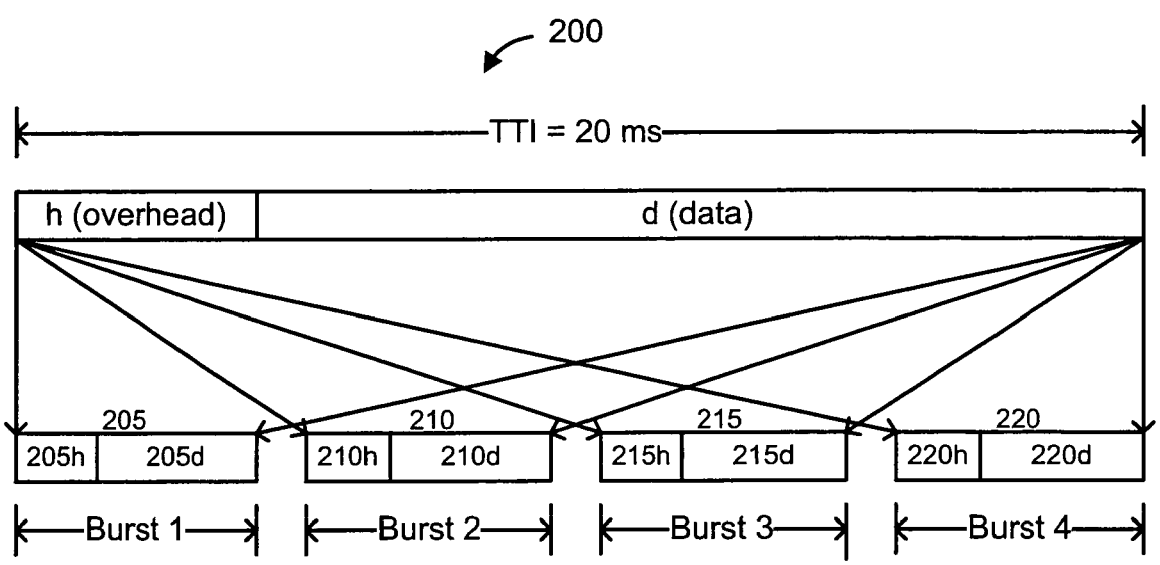
FIG. 2 illustrates a transmission time interval used in the network of FIG. 1.

A header may be included in each packet transmission in order to accommodate link adaptation algorithm. The information in the header may be repeated every TTI. FIG. 2 illustrates an exemplary TTI 200 with four bursts of packets 205, 210, 215, and 220. Each packet (205, 210, 215, and 220) includes an overhead portion (headers 205h, 210h, 215h, and 220h) and a data portion (data 205d, 210d, 215d, and 220d). Note that FIG. 2 and all other Figures are not drawn to scale; thus, the relative time durations of the header and data portions of each of the packets in FIG. 2 are merely exemplary.

Uplink and downlink control information is used to configure the BTS 120 and the mobile stations 130 for exchanging data packets as described above. On the downlink, a packet header may contain both uplink and downlink control information. The uplink control information transmitted in the header of a downlink packet may include three bits uplink H-ARQ ACK/NAK (one ACK/NAK bit for each of three mobile stations that can be multiplexed in the same slot), and three bits for up/down uplink power control (one bit for each mobile station). Power control provided by this structure allows 50 bits-per-second up/down power adjustments for twenty-millisecond TTIs. Step sizes may be set between one and two dB, for example. Uplink power control is desirable because multiple users can share a common uplink slot, and various multi-user receivers favor different power ratios among users. Power control mechanism allows the network to adjust transmitted uplink power according to the deployed multi-user algorithm, current radio conditions, and other parameters and requirements.

The downlink control information in the downlink packet header may include three bits indicating traffic channel Power Offset relative to pilot power (fraction of power used to transmit to the mobile station in weak radio conditions), three modulation and coding (MCS) bits indicating selected modulation and coding scheme, one or two ReTX bits indicating retransmission number, and a one-bit flag F indicating transmission of a new data block. The new data block flag F and the ReTX field allow the mobile station to infer part of control information. For example, modulation and coding do not change from one transmission to the other in some variants. If the mobile station decodes the control information that accompanies the second transmission, for example, it may be able to determine the MCS for the first transmission.

Figure 3:
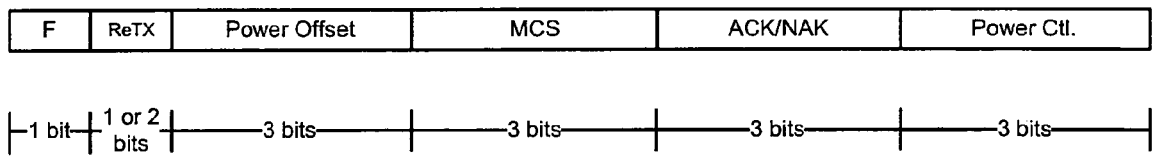
FIG. 3 illustrates selected fields of a downlink header with control information, in accordance with aspects of the present invention.

The exemplary downlink control structure described in the immediately preceding paragraphs is illustrated in FIG. 3, which shows selected fields of an exemplary downlink header 300 with fourteen or fifteen bits of downlink control information, depending on the length of the ReTX field. The header may further contain cyclic redundancy check (CRC) bits and reserved bits, for example, eight CRC bits and two reserved bits, bringing the total number of bits to 24 or 25.

The encoding options for the downlink header may be as follows:

Constraint length 9, ¼ convolution code, resulting in 32*4/(116*4)=0.28 or 28 percent overhead. This configuration may be suitable for very low C/I ratio regions, although other regions are not necessarily excluded. In some simulations, it works well for C/I ratios as low as −4 dB. In order to be able to compensate of the increased overhead, spectral efficiency needs to be improved by a little over 38 percent $$\left(\left[\frac{1}{(1-0.28)}\right] \cong 1.38\right).$$

Constraint length 9, ½ convolution code, resulting in 32*2/(116*4)=0.14 or 14 percent overhead. The C/I per coded bit may be 0 dB or above. In order to be able to compensate for the increased overhead, spectral efficiency needs to be improved by 16 percent $$\left(\left[\frac{1}{(1-0.14)}\right] \cong 1.16\right).$$

In addition to the overhead shown in FIG. 3 and the CRC and reserved bits, the data payload portion of the downlink frame/packet may contain MAC IDs and length fields indicating the useful payload for each mobile station. In case of superposition coded packets, data portion of the mobile station in weak radio conditions may contain all necessary header information for all other mobile stations as well. This additional overhead is typically one byte or less per mobile station, because MAC ID can be two bits, and the length field typically need not exceed six bits.

Figure 4:
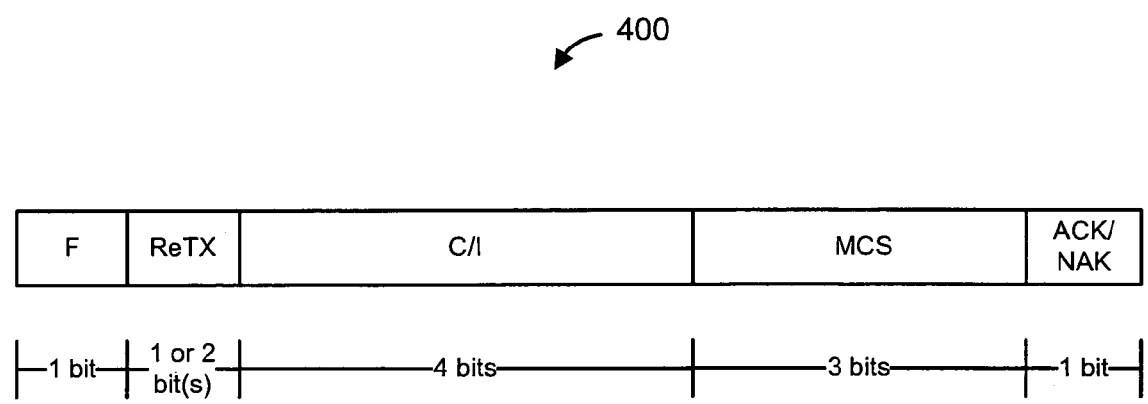
FIG. 4 illustrates selected fields of an uplink header with control information, in accordance with aspects of the present invention.

Uplink overhead may be multiplexed in a similar fashion to that of the downlink overhead. FIG. 4 illustrates selected fields of an exemplary uplink header 400 that includes a four-bit C/I field with carrier-to-interference ratio information that may be used for downlink rate selection, a three-bit MCS field used to convey the selected modulation and coding scheme for the uplink, one-bit ACK/NAK field carrying positive or negative acknowledgement for downlink transmission, an ReTX field of one or two bits for conveying retransmission number, and a one-bit F flag indicating transmission of a new data block.

The total number of bits in the fields shown in FIG. 4 is ten or eleven. The uplink header may additionally contain eight bits of CRC, and three reserved bits, bringing the total number of bits to twenty-one or twenty two, depending on the length of the ReTX field. The encoding options for the uplink header may be as follows:

Constraint length 9, ¼ convolution code, resulting in 28*4/(116*4)=0.24 or 24 percent overhead. Therefore, approximately 32 percent improvement in spectral efficiency will compensate for the increased overhead $$\left(\left[\frac{1}{(1-0.24)}\right] \cong 1.32\right).$$

This configuration may be suitable for use in very low C/I ratio regions, although other regions are not necessarily excluded. Consider an example where symbol level C/I is ∼−5 dB, accounting for three equal strength users sharing the same slot and one interfering user (from another cell, for example) with the same strength as the other three users. Assuming −5 dB C/I and dual receiver antenna diversity, control channel information can be decoded when required Eb/Nt (the ratio of energy-per-bit to the effective noise spectral density) for the selected code is below 4 dB, which is well within the capabilities of many convolutional codes.

Constraint length 9, ½ convolution code, resulting in 28*2/(116*4)=0.12 or 12 percent overhead. In this case, in order to be able to compensate for the increased overhead, spectral efficiency needs to be improved by $$\left(\left[\frac{1}{(1-0.12)}\right] \cong 1.14\right),$$

or fourteen percent. This configuration is sufficient for most cases, because it can handle symbol level C/I of −2 dB.

The decoding of overhead information may require joint decoding, interference cancellation, or both of these techniques. Overhead information received from all users may be approximately synchronized, so that joint decoding and interference cancellation can be limited to the header portion. Any overlap with the data portion may be treated as interference. Separate decoder may jointly decode the data portion. In some variants, the training sequences for uplink channel estimation and tracking are selected to minimize cross correlation between sequences, in order to avoid joint time tracking algorithms for all users that share a common slot.

Joint detection may be performed to facilitate multiple mobile station uplink transmissions in one slot. In some cases, a successive interference cancellation (SIC) receiver may be suitable for this function. A joint multi-user receiver may also be used. Such a receiver would make the system throughput less susceptible to changes in rate and power distribution among mobile stations. The complexity of the multi-user receiver should remain manageable for joint decoding of 2, 3, or 4 users. A higher number of users is also not excluded.

Uplink rate control may be performed with Layer 3 signaling.

The BTS 120 may configure itself and the mobile stations to switch assigned slots. This may be desirable to regroup the mobile stations as radio conditions change. A mobile station may be able to perform a "soft" switch to a different slot, that is, be able to transmit and receive in two different slots, on either or both uplink and downlink. This feature is analogous to the capability of a mobile station to transmit and receive on two downlink and two uplink slots in conventional GSM-based systems. Note that due to H-ARQ operation, there maybe be up to four pending transmission in progress at any point in time (assuming that there are only two H-ARQ instances).

In order to keep the number of H-ARQ instances to a minimum of two, it may be desirable to select the uplink channel so that a mobile station has enough time to decode the received downlink packet and form an uplink header that contains ACK/NAK information. It may also be desirable to allow enough time for the BTS to decode an uplink packet and form a downlink header that contains ACK/NAK information for the uplink transmission. In some variants, for example variants with a total of eight slots in a burst, offsets of three and four slots work well for these purposes. Offsets of two slots and five or more slots may also be used in some circumstances.

Let us next address VoIP packet transmission over GSM air interfaces. The first question is whether a VoIP frame will fit in one RLC/MAC (Radio Link Control/Medium Access Control) block. It has been argued that with the use of appropriate header compression, one RLC/MAC block coded with MCS 7, 8, or 9 can contain one VoIP frame. Moreover, while the size of a VoIP frame depends on the particular codec employed, twenty bytes are typically an acceptable payload (from the mean opinion score point of view), representing ten milliseconds of a voice stream in VoIP networks. This means that even with no RTP compression, a typical VoIP datagram may fall in the 64 to 66 byte range. With RTP compression, a typical compressed VoIP datagram may fall in the 22 to 24 byte range. (This does not include GERAN-specific headers, such as SNDCP/LLC/RLC.) Thus, a typical VoIP frame should fit in one RLC.MAC block of a GSM air interface.

A VoIP call is by its nature bidirectional, while of course being a data call. We propose exploiting the downlink/uplink symmetry for fast feedback of ARQ, link quality information, Incremental Redundancy H-ARQ, and possibly other information. In particular, a mechanism is introduced into a GERAN system (such as the system 100 of FIG. 1) to provide fast uplink feedback for downlink blocks that have or have not been received, and to provide fast downlink feedback for the uplink blocks that have or have not been received. This can be done with a modification of the RLC/MAC header of the uplink and downlink frames.

Figure 5:
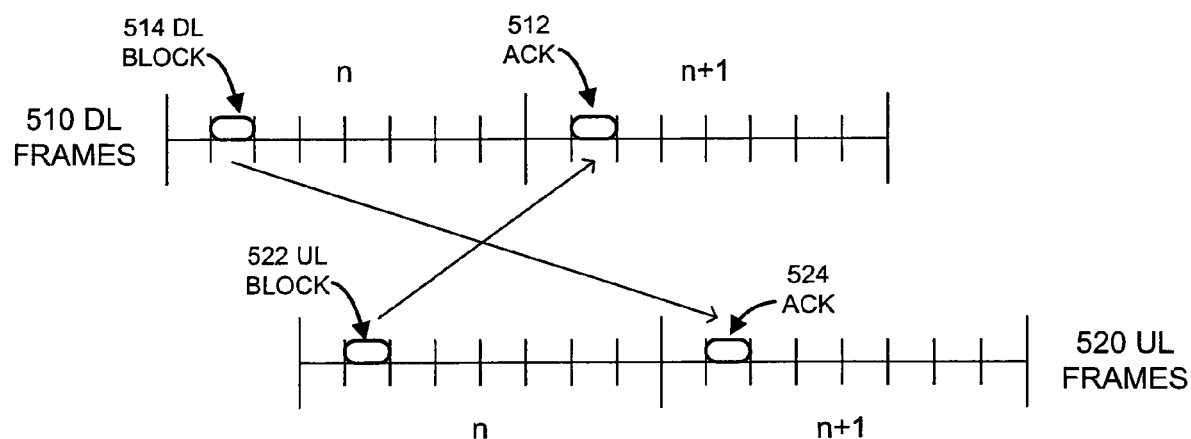
FIG. 5 illustrates a fast feedback scheme for an air interface, in accordance with aspects of the present invention.

Note that such a feedback mechanism does not necessarily require the use of a bitmap. Instead, an implicit rule may be adopted to define (1) a relationship between transmission of uplink blocks and corresponding feedback in downlink blocks, and (2) transmission of downlink blocks and corresponding feedback in uplink blocks. For example, the uplink in radio block in frame "n+1" may provide feedback for the downlink block in frame "n" (whether the block was received or not); and the downlink in radio block in frame "n+1" may provide feedback for the uplink block in frame "n" (also regardless of whether the block was received or not). This scheme is illustrated in FIG. 5, in which an upper part 510 depicts downlink air interface frames, and a lower part 520 depicts uplink air interface frames. As shown in this Figure, acknowledgement for an uplink block 522 of an uplink frame "n" is transmitted in a downlink block 512 of a frame "n+1." Similarly, acknowledgement for a downlink block 514 of a downlink frame "n" is transmitted in an uplink block 524 of an uplink frame "n+1." Here, uplink and downlink frames with the same sequence number, "n," for example, are the frames with the largest overlap in time.

It should be noted that the frame offset need is not necessarily be one frame as shown in FIG. 5; frame offset may be two, three, four, or even a higher number of frames. Thus, acknowledgement for an uplink block in an uplink frame "n" may be transmitted in a downlink block of a frame "n+m," and acknowledgement for a downlink block of a downlink frame "n" may be transmitted in an uplink block of an uplink frame "n+p." Both "m" and "p" may be integers equal to or greater than one, they may be equal to each other or not equal to each other, and they may be predetermined or variable. For example, "m" may be equal to two, and "p" may be equal to three.

Furthermore, an acknowledgement for multiple (two or more) downlink blocks may be transmitted in each or selected uplink frames; similarly, an acknowledgement for multiple uplink blocks may be transmitted in each downlink frame or in selected downlink frames. For example, an uplink frame "n+2" may carry an acknowledgement for downlink frames "n" and "n+1"; and a downlink frame "n+2" may carry an acknowledgement for uplink frames "n" and "n+1." Once again, the acknowledgement scheme is not necessarily identical for uplink and downlink air interface frames. For example, an uplink frame "n+2" may carry an acknowledgement for downlink frames "n" and "n+1," while a downlink frame "n+2" may carry an acknowledgement for uplink frames "n−1" and "n." As another example, an uplink frame may carry acknowledgement for a different number (either more or less) of blocks than a downlink frames. Note that the acknowledgement for multiple frames may be repeated. For example, each uplink frame may carry acknowledgement for blocks in two preceding downlink frames, and each downlink frame may carry acknowledgement for blocks in two preceding uplink frames.

It should be understood that the acknowledgments and other feedback are provided automatically, i.e., in response to receipt of the blocks, rather than in response to polling. The acknowledgement and other feedback may be included in an RLC/MAC header of a block sent from the receiver of the block(s) being acknowledged to the source of the block(s) being acknowledged.

One aspect of the introduction of fast automatic feedback techniques described above is that they could be used to provide a faster Incremental Redundancy H-ARQ, especially if the fast feedback techniques are used in conjunction with the shorter TTI, and with RLC/MAC non-persistent mode. (Incremental Redundancy H-ARQ refers to adaptation of error correcting coding redundancy to fluctuating radio conditions.) A VoIP call over a GERAN air interface could then enjoy Incremental Redundancy gain without incurring an excessive delay budget hit.

Fast feedback techniques described above may be extended further beyond acknowledgement and Incremental Redundancy H-ARQ information. For example, the quality of the air interface link (e.g., C/I ratio of the downlink) may also be updated at more frequent intervals. In some variants, a mobile station transmits to the BTS estimates of the quality of the downlink connection with every frame. In some variants, a mobile station transmits to the BTS estimates of the quality of the downlink connection whenever the mobile station transmits an acknowledgement of a downlink block. In some variants, a mobile station transmits to the BTS estimates of the quality of the downlink connection once in every two frames, three frame, four frames, or five frames.

A difficulty may arise in applying the fast feedback techniques described above to systems with discontinuous transmission, since continuous communications on both uplink and downlink are presumed. (Discontinuous transmission or "DTX" refers to not transmitting from a wireless communication device when there is no voice input to transmit.) When there is no voice traffic in a DTX system, there may be nothing onto which the fast feedback information can be piggybacked. In some variants, this difficulty is circumvented through the use of so-called "dummy packets," that is, feedback-only packets to be sent when user voice traffic is not present. Dummy packets may be sent using very low rate and low transmitted energy, in order to minimize the interference created by such packets and the energy consumed by such packets. Dummy packets may carry H-ARQ acknowledgements, link quality information, Incremental Redundancy H-ARQ information, or other feedback information.

Although steps of the various methods may have been described serially in this disclosure, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every step is necessarily required in every embodiment in accordance with the invention, while some steps that have not been specifically illustrated may be desirable in some embodiments in accordance with the invention.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the embodiments disclosed herein may be embodied directly in hardware, in a software module executed by a processor, or in a combination of the two. A software module may reside in random access memory (RAM), flash memory, read only memory (ROM), erasable programmable read only memory (EPROM), electrically erasable programmable read only memory (EEPROM), registers, hard disk, removable disk, CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user equipment device (mobile station). Alternatively, the processor and the storage medium may reside as discrete components in a user equipment device. The processor and the storage medium may also reside in a BTS or a radio network controller.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

The invention claimed is:

1. A method of transmitting information over a time division multiple access air interface of a cellular communication system, the method comprising:

grouping a first plurality of mobile stations in a sector served by a base transceiver station of the cellular communication system, the first plurality of mobile stations comprising a first mobile station and a second mobile station;

transmitting from the base transceiver station on a first carrier frequency during a first time slot a first downlink data block to the first mobile station using a first transmitted power; and transmitting from the base transceiver station on the first carrier frequency during the first time slot a second downlink data block to the second mobile station using a second transmitted power;

wherein the first transmitted power and the second transmitted power are such that the first mobile station can receive and decode the first data block, and the second mobile station can receive and decode the second data block estimating first radio conditions of the first mobile station during the first time slot;

estimating second radio conditions of the second mobile station during the first time slot; and determining the first transmitted power and the second transmitted power as a function of the first and second radio conditions transmitting from the base transceiver station on a second carrier frequency during the first time slot a third downlink data block to a third mobile station in the sector served by the base transceiver station;

wherein the third downlink data block is not multiplexed, and the step of transmitting on the second carrier frequency is performed in accordance with Global System for Mobile Communications (GSM) Enhanced Data rates for GSM Evolution (EDGE) Radio Access Network (GERAN) standard.

2. The method of claim 1, wherein the step of grouping comprises selecting the first and second mobile stations so that downlink carrier-to-interference (C/I) ratio of the second mobile station exceeds by a first predetermined measure downlink C/I ratio of the first mobile station during the first time slot.

3. The method of claim 1, wherein the step of grouping comprises selecting the first and second mobile stations so that downlink carrier-to-interference (C/I) ratio of the second mobile station exceeds by at least 10 decibels downlink C/I ratio of the first mobile station during the first time slot.

4. The method of claim 1, wherein the step of grouping comprises selecting the first and second mobile stations so that downlink carrier-to-interference (C/I) ratio of the second mobile station exceeds by at least 6 decibels downlink C/I ratio of the first mobile station during the first time slot.

5. The method of claim 1, wherein the step of grouping comprises selecting the first and second mobile stations so that downlink carrier-to-interference (C/I) ratio of the second mobile station exceeds by at least 3 decibels downlink C/I ratio of the first mobile station during the first time slot.

6. The method of claim 1, wherein:
the first plurality of mobile stations further comprises a third mobile station; the method further comprising:
estimating third radio conditions of the third mobile station during the first time slot; and
transmitting from the base transceiver station on the first carrier frequency during the first time slot a third downlink data block to the third mobile station using a third transmitted power such that the third mobile station can receive and decode the third downlink data block.

7. The method of claim 6, wherein the first transmitted power is greater than the second transmitted power, the first transmitted power is greater than the third transmitted power, the first downlink data block comprises a header, and the header comprises:
an acknowledgment/negative acknowledgement (ACK/NAK) field indicating receipt or non receipt by the base transceiver station of a first uplink block from the first mobile station, a second uplink block from the second mobile station, and a third uplink block from the third mobile station, the first, second, and third uplink blocks having been transmitted during a time slot preceding the first time slot;
a power control field with a first power control subfield indicating power adjustment for uplink power transmission from the first mobile station, a second power control subfield indicating power adjustment for uplink power transmission from the second mobile station, and a third power control subfield indicating power adjustment for uplink power transmission from the third mobile station; and
modulation and coding scheme (MCS) field indicating modulation and coding of downlink transmission.

8. The method of claim 7, wherein the header further comprises:
a power offset field indicating downlink traffic channel power offset relative to a pilot power;
an F flag indicating transmission of a new data block; and
an ReTX field indicating retransmission number.

9. The method of claim 8, wherein the ACK/NAK field consists of 3 bits, the power control field consists of 3 bits, the power offset field consists of 3 bits, the MCS field consists of 3 bits, the F flag consists of 1 bit, and the ReTX field consists of 1 or two bits.

10. The method of claim 8, wherein the ACK/NAK field comprises 3 bits, the power control field comprises 3 bits, the power offset field comprises 3 bits, the MCS field comprises 3 bits, the F flag comprises 1 bit, and the ReTX field comprises 1 bit.

11. The method of claim 1, wherein the first transmitted power is greater than the second transmitted power, the first downlink data block comprises a header, and the header comprises:
an acknowledgment/negative acknowledgement (ACK/NAK) field indicating receipt or non receipt by the base transceiver station of a first uplink block from the first mobile station, and receipt or non receipt of a second uplink block from the second mobile station, the first and second uplink blocks having been transmitted during a time slot preceding the first time slot;
a power control field with a first power control subfield indicating power adjustment for uplink power transmission from the first mobile station, and a second power control subfield indicating power adjustment for uplink power transmission from the second mobile station; and
modulation and coding scheme (MCS) field indicating modulation and coding used in the transmitting steps.

12. The method of claim 1, further comprising:
receiving at the base transceiver station on a third carrier frequency during a second time slot a first uplink block from the first mobile station and receiving on the third carrier frequency during the second time slot a second uplink block from the second mobile station, wherein the first and second uplink blocks collide at the base transceiver station; and
jointly decoding the first and second uplink blocks at the base transceiver station.

13. The method of claim 1, wherein the air interface is implemented using frequency hopping.

14. A base transceiver station of a time division multiple access cellular communication system, the base transceiver station comprising:
a receiver;
a transmitter;
a memory storing program code; and
a processor coupled to the receiver, transmitter, and the memory, wherein the processor under control of the program code is configured to cause the base transceiver station to perform steps comprising:
grouping a first plurality of mobile stations in a sector served by the base transceiver station, the first plurality of mobile stations comprising a first mobile station and a second mobile station;
transmitting from the base transceiver station on a first carrier frequency during a first time slot a first downlink data block to the first mobile station using a first transmitted power; and
transmitting from the base transceiver station on the first carrier frequency during the first time slot a second downlink data block to the second mobile station using a second transmitted power;
wherein the first transmitted power and the second transmitted power are such that the first mobile station can receive and decode the first data block, and the second mobile station can receive and decode the second data block
estimating first radio conditions of the first mobile station during the first time slot; estimating second radio conditions of the second mobile station during the first time slot; and determining the first transmitted power and the second transmitted power as a function of the first and second radio conditions
transmitting from the base transceiver station on a second carrier frequency during the first time slot a third downlink data block to a third mobile station in the sector served by the base transceiver station;

wherein the third downlink data block is not multiplexed, and the step of transmitting on the second carrier frequency is performed in accordance with Global System for Mobile Communications (GSM) Enhanced Data rates for GSM Evolution (EDGE) Radio Access Network (GERAN) standard.

15. The base transceiver station of claim 14, wherein the first transmitted power is greater than the second transmitted power, the first downlink data block comprises a header, and the header comprises:
an acknowledgment/negative acknowledgement (ACK/NAK) field indicating receipt or non receipt by the base transceiver station of a first uplink block from the first mobile station, and receipt or non receipt by the base transceiver station of a second uplink block from the second mobile station, the first and second uplink blocks having been transmitted during a time slot preceding the first time slot;
a power control field with a first power control subfield indicating power adjustment for uplink power transmission from the first mobile station, and a second power control subfield indicating power adjustment for uplink power transmission from the second mobile station; and
modulation and coding scheme (MCS) field indicating modulation and coding used in the transmitting steps.

16. A method of transmitting information over a time division multiple access air interface of a cellular communication system, the method comprising:
grouping a first plurality of mobile stations in a sector served by the base transceiver station, the first plurality of mobile stations comprising a first mobile station and a second mobile station;
transmitting from the base transceiver station on a first carrier frequency during a first time slot a first downlink data block to the first mobile station using a first transmitted power; and
transmitting from the base transceiver station on the first carrier frequency during the first time slot a second downlink data block to the second mobile station using a second transmitted power;
wherein the first transmitted power and the second transmitted power are such that the first mobile station can receive and decode the first data block, and the second mobile station can receive and decode the second data block
grouping a first plurality of mobile stations in a sector served by a base transceiver station of the cellular communication system, the first plurality of mobile stations comprising a first mobile station and a second mobile station;
transmitting from the base transceiver station on a first carrier frequency during a first time slot a downlink multi-user data packet to the first and second mobile stations;
wherein the multi-user downlink data packet comprises first payload data intended for the first mobile station, second payload data intended for the second mobile station, and a header, the header indicating to the first and second mobile stations the first payload data and the second payload data so that the first mobile station can use the first payload data and the second mobile station can use the second payload data
transmitting from the base transceiver station on a second carrier frequency during the first time slot a third downlink data packet to a third mobile station in the sector served by the base transceiver station;
wherein the third downlink data packet is non multiplexed single-user packet, and the step of transmitting on the second carrier frequency is performed in accordance with Global System for Mobile Communications (GSM) Enhanced Data rates for GSM Evolution (EDGE) Radio Access Network (GERAN) standard.

17. The method of claim 16, further comprising:
receiving at the base transceiver station on a third carrier frequency during a second time slot a first uplink packet from the first mobile station, and receiving on the third carrier frequency during the second time slot a second uplink packet from the second mobile station, wherein the first and second uplink packets collide at the base transceiver station; and
jointly decoding the first and second uplink packets at the base transceiver station.

18. A base transceiver station of a time division multiple access cellular communication system, the base transceiver station comprising:
a receiver;
a transmitter;
a memory storing program code; and
a processor coupled to the receiver, transmitter, and the memory, wherein the processor under control of the program code is configured to cause the base transceiver station to perform steps comprising:
grouping a first plurality of mobile stations in a sector served by the base transceiver station, the first plurality of mobile stations comprising a first mobile station and a second mobile station;
transmitting from the base transceiver station on a first carrier frequency during a first time slot a multi-user data packet to the first and second mobile stations;
wherein the multi-user data packet comprises first payload data intended for the first mobile station, second payload data intended for the second mobile station, and a header, the header indicating to the first and second mobile stations the first payload data and the second payload data so that the first mobile station can use the first payload data and the second mobile station can use the second payload data
transmitting from the base transceiver station on a second carrier frequency during the first time slot a third data packet to a third mobile station in the sector served by the base transceiver station;
wherein the third data packet is a non multiplexed single-user packet, and the step of transmitting on the second carrier frequency is performed in accordance with Global System for Mobile Communications (GSM) Enhanced Data rates for GSM Evolution (EDGE) Radio Access Network (GERAN) standard.

19. The base transceiver station of claim 18, wherein the processor under control of the program code is further configured to cause the base transceiver station to perform steps comprising:
receiving at the base transceiver station on a third carrier frequency during a second time slot a first uplink packet from the first mobile station and receiving on the third carrier frequency during the second time slot a second uplink packet from the second mobile station, wherein the first and second uplink packets collide at the base transceiver station; and
jointly decoding the first and second uplink packets at the base transceiver station.

* * * * *